UNITED STATES PATENT OFFICE.

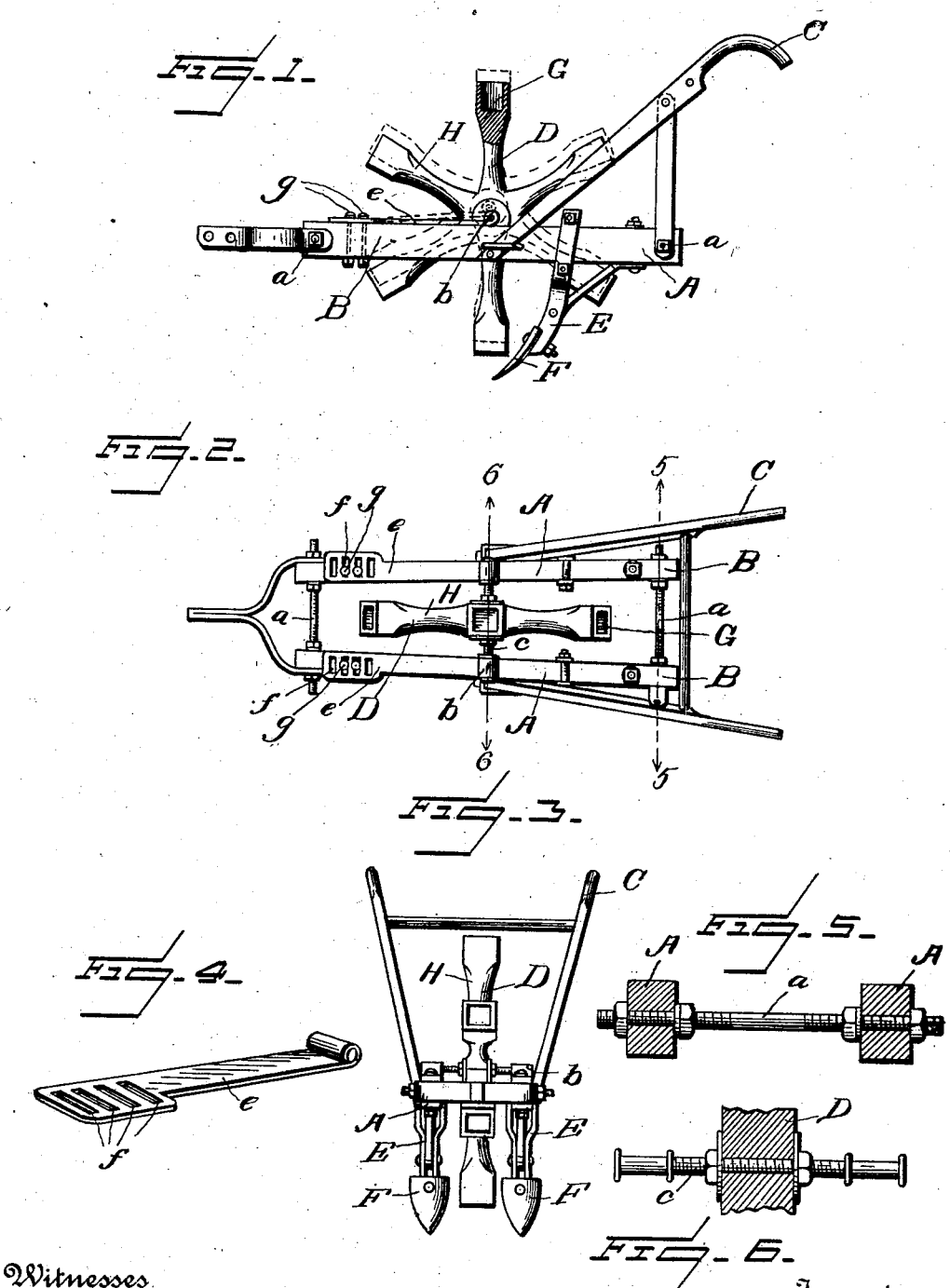

ROBERT F. LOWREY, OF PERDUEHILL, ALABAMA.

COTTON-CHOPPER.

SPECIFICATION forming part of Letters Patent No. 696,348, dated March 25, 1902.

Application filed September 10, 1901. Serial No. 74,894. (No model.)

*To all whom it may concern:*

Be it known that I, ROBERT F. LOWREY, a citizen of the United States, and a resident of Perduehill, in the county of Monroe and State of Alabama, have made a certain new and useful Invention in Cotton-Choppers; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a side elevation of my device, partly in section. Fig. 2 is a plan view of the same. Fig. 3 is a front view of the same. Fig. 4 is a detail view of one of the spring-plates $e$. Figs. 5 and 6 are sections on lines 5 5 and 6 6, Fig. 2.

The invention relates to cotton-choppers; and it consists in the novel construction and combinations of devices, as hereinafter set forth.

The object of the invention is to thin out the growth of young cotton in a regular manner, so as to leave the stands of cotton in full form and similar to each other while effectually destroying the other growth.

In the accompanying drawings the letter A designates the frame of the chopper, consisting of the parallel plow-beams B B and the handles C, connected thereto. The two plow-beams are connected and braced by the adjustable transverse bolt-rods $a$ $a$ at the ends thereof, while midway of each beam is provided a bearing $b$ for the adjustable journal $c$ of the blocker-wheel D. These bearings are formed at the ends of the adjustable spring-plates $e$ $e$, each of which is provided with transverse slots $f$ $f$ and bolts $g$ $g$, whereby the plates are secured in position after adjustment. It will be apparent that these bearings can be adjusted longitudinally as well as laterally and that the elastic nature of the plates serves to give the bearings a cushioned or yielding character to relieve the blocker-wheel of uneven or jolting motion due to the pressure of stones, roots, &c., in the ground.

To the beams B are secured the pivotally-adjustable plow-standards E, carrying the shares or shovels F, which serve to turn out the growth of cotton and effectually cover it up, so that it is destroyed.

The blocking-wheel D is provided on its periphery with the cups G, presenting outwardly. Usually these cups are arranged on the ends of spokes H, which are set at a regular distance apart, so that the series of cups will be properly set to cover in the stands of cotton which are to be left growing. A thirty-inch wheel of six spokes fifteen inches apart, such spokes having the cup ends about four inches square, will serve an excellent purpose in the construction, as it is not liable to be clogged by the immediate growth. The beam is adjustable to bring it in proper relation to the blocker-wheel, and the plow-shovels are adjustable, so that they will have their points in proper relative position to the downwardly-presenting cup of said wheel.

Having described this invention, what I claim, and desire to secure by Letters Patent, is—

A cotton-chopper consisting of the combination with the laterally-adjustable beams carrying the cultivator-shares, of the plate-springs having a plurality of transverse slots at one end portion thereof, allowing for both lateral and longitudinal adjustment of the springs, and journal-eyes at the opposite end portions thereof, the bolts engaging a portion of said slots and connecting beams and springs, and the chopper-wheel having outwardly-presenting cups, and provided with bearings in said eyes, substantially as specified.

In testimony whereof I affix my signature in presence of two witnesses.

ROBERT F. LOWREY.

Witnesses:
I. K. AGU,
JNO. M. COXWELL.